Aug. 15, 1944.　　　　E. H. GUTHIER　　　　2,355,798
CONTINUOUS TYPE STEAM BLANCHER
Filed July 2, 1943　　　2 Sheets-Sheet 1
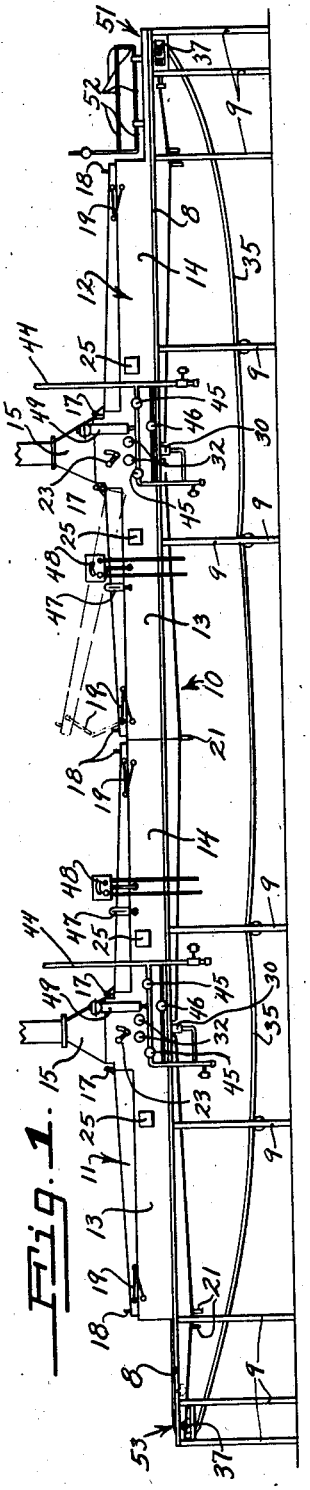
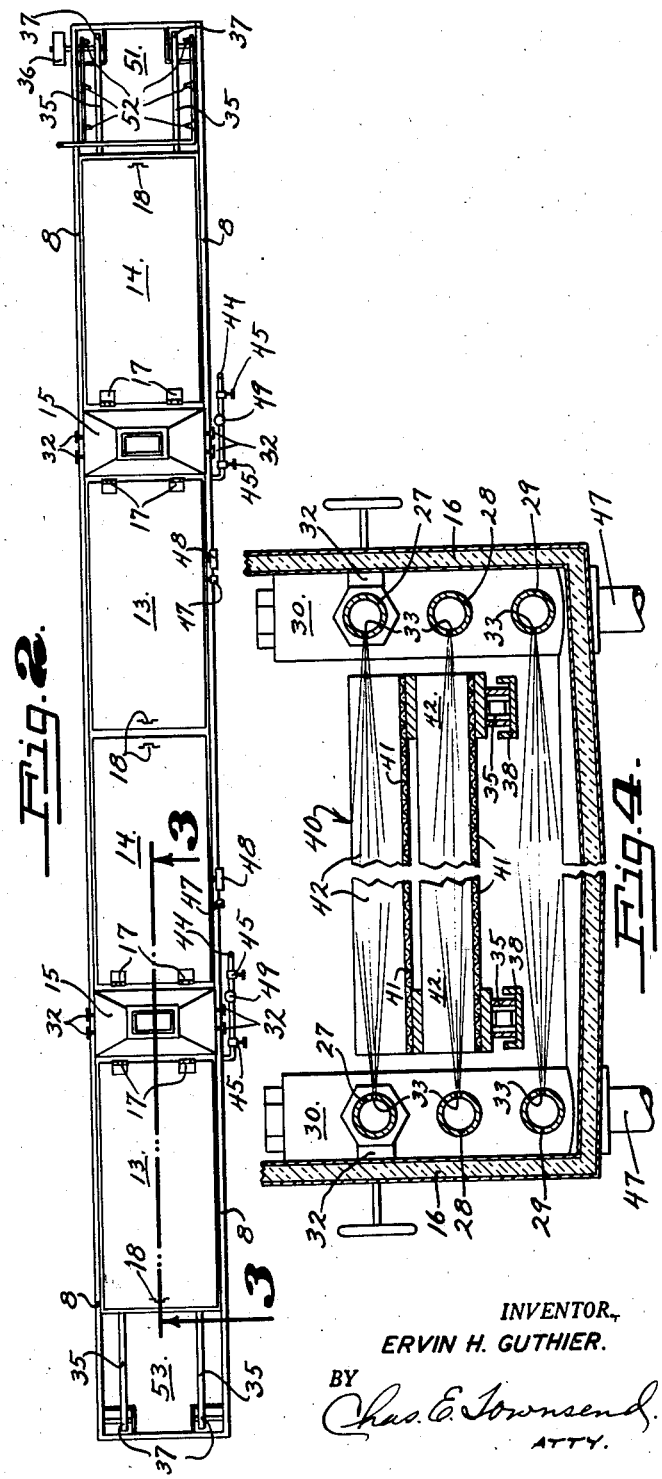
INVENTOR.
ERVIN H. GUTHIER.
BY Chas. E. Townsend
ATTY.

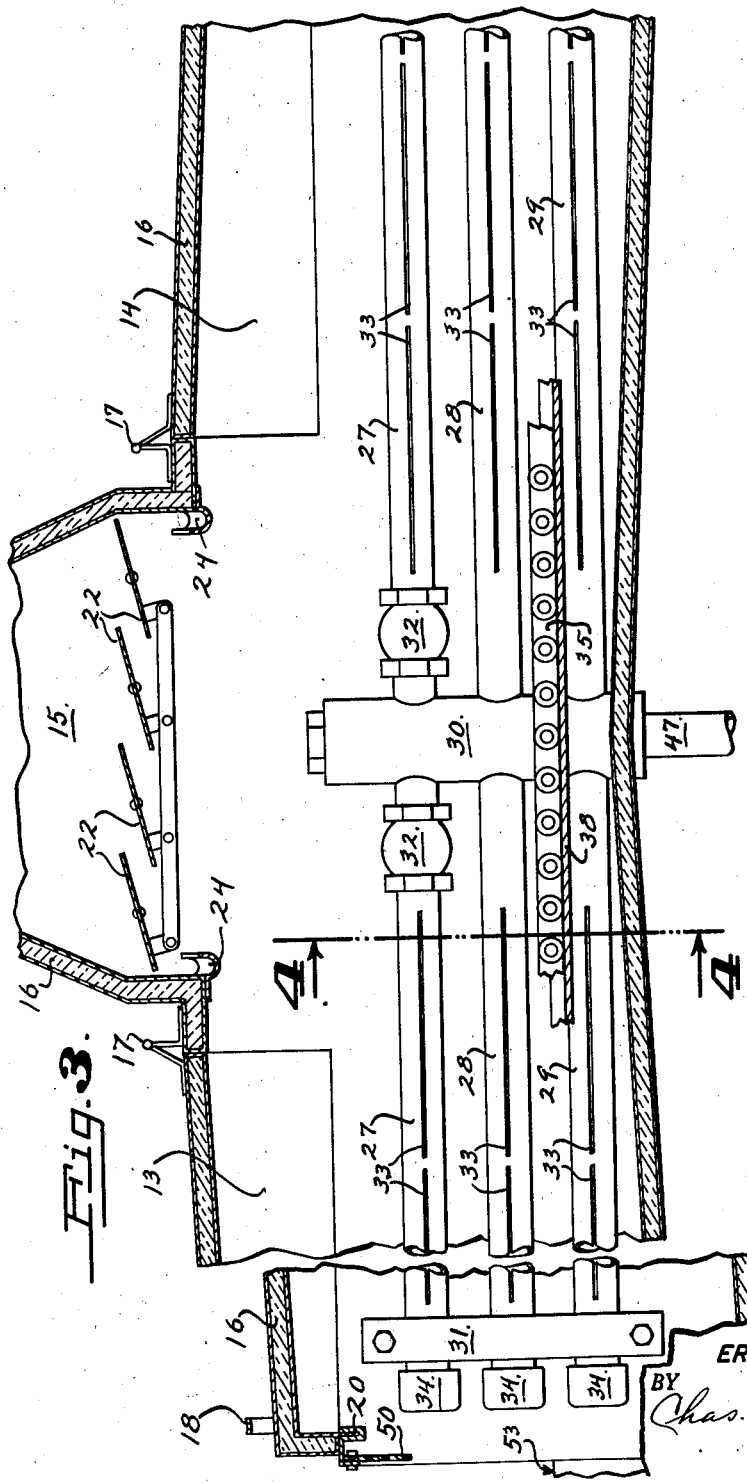

Patented Aug. 15, 1944

2,355,798

UNITED STATES PATENT OFFICE 2,355,798

CONTINUOUS TYPE STEAM BLANCHER

Ervin H. Guthier, Santa Ana, Calif.

Application July 2, 1943, Serial No. 493,293

7 Claims. (Cl. 99—443)

This invention relates to pre-cooking apparatus for food products and more particularly to a novel continuous conveyor type steam blancher for food products.

It is desirable to pre-cook certain foods prior to subjecting them to a dehydration process. In working with vegetables, such as carrots or cabbage, it is preferable to dice or shred and pre-cook them before dehydration in order to obtain a better, more stable product. Steam cooking has been found to be an excellent medium for pre-cooking and it is the general object of my invention to improve apparatus for pre-cooking vegetables and other products by means of steam heat.

My apparatus, designed for mass production tempo processing of foods, is a continuous conveyor type of steam cooker comprising an undulated, insulated, open-ended housing formed by a series of connected inclined flue portions and provided with special steam emission heads. The novel design of the housing allows a uniform concentration of hot steam throughout the length of the apparatus, and yet prevents dissipation of steam through the open ends thereof.

My peculiarly shaped housing channels the steam to the high points thereof rather than allowing it to dissipate through the feeding and collecting ends of the apparatus. The special steam emission heads are located at the high points of the apparatus and the egress of steam therefrom is governable by the operator. The sloping floors of the housing portions, parallel to the correspondingly inclined roof portions, provide a fine drainage of waste water developed by steam condensation.

The continuous conveyor system which carries the food stuff through the housing lies wholly in a constant horizontal plane and is not inclined in conformity with the undulations of the housing. Slotted steam pipes are provided within the housing throughout the length thereof and are so arranged and fed as to insure a maximum of heat application uniformly throughout the housing and adapted to direct the steam to the foods sought to be treated.

The housing is constructed so that water formed by steam condensation does not come into contact with the food and thereby contaminate it or cause deleterious results. Convenience and facility in handling the food stuffs, in cleaning and repairing the apparatus, and in regulating heat application and many other factors are adequately provided for by means of suitably located service windows, separable housing portions, and special valve controls and other novel features.

The objects of my invention are to provide a mass production pre-cooker for vegetables and the like which provides a controllable steam temperature which is uniform throughout the apparatus and which further enables a concentration of heat application to the foods being treated throughout traversal thereof through the apparatus without danger of heat dissipation and without loss of speed in production of processed foods; to provide a continuous conveyor type of pre-cooker having an undulating housing open at both ends and a level conveyor system therein lying wholly in a horizontal plane; to provide an apparatus which has the advantages of a completely enclosed cooking apparatus and yet wherein both the feeding and collecting ends thereof are open for mass production tempo food processing; to provide a pre-cooker apparatus wherein a very high concentration of uniform steam heat may be obtained without heat wastage; to provide a substantially "drip-proof" pre-cooker; to provide a pre-cooker apparatus designed for efficiency and rapidity of action and to provide a superior pre-cooking apparatus which is comparatively inexpensive to manufacture and assemble and easy for the unskilled to operate successfully. Many other objects and advantages will become apparent upon reading the specification and referring to the drawings attached hereto and made a part hereof.

Referring to the drawings, in which similar characters of reference represent corresponding parts in the several views:

Fig. 1 is a side elevation of my invention.

Fig. 2 is a top plan view of my invention.

Fig. 3 is a longitudinal sectional view of a portion of my apparatus taken on line 3—3 of Fig. 2.

Fig. 4 is a vertical cross sectional view of my invention indicated by line 4—4 of Fig. 3.

The apparatus is herein illustrated as having a frame 8 supported on legs 9, although it is obvious that this need not be the case. For convenience in manufacture, assembly, shipment and repair, the housing carried on the frame, generally indicated at 10, is formed of two interconnected, identical sections designated at 11 and 12, although obviously the housing may be formed integrally or of a greater number of so-called sections. For purposes of description, I refer in the drawings and description to the sections 11 and 12, in turn, each comprising two identical flue portions 13 and 14 inclined upwardly toward one another and communicating with a chimney 15 positioned in the ridge or apex portion of each section.

The housing walls are completely heat insulated by a suitable insulating medium indicated at 16. The tops of the flues are hinged as at 17 and provided with handles 18 in order to allow convenient access to the interior of the apparatus for sterilizing or cleansing purposes. Toggle link supports 19 are provided to hold the flue tops in raised position, as shown in dotted lines in Fig. 1. The tops and upright walls of the flues are formed to make a steam seal connection as indicated at 20 (Fig. 3) when closed. Drain pipes 21 are provided in the low points of the several flues in order to draw off water formed by steam condensation.

The chimneys 15 are provided with louvers 22, which are adjustable by manipulation of controls 23, in order to govern egress of steam therefrom. Laterally inclined gutter lips 24 are formed adjacent the chimneys to drain off water to the sides of the housing in order to prevent dripping on the foods. Windows 25 are provided in the walls of the housing to allow easy inspection and service of the interior thereof.

In the apparatus herein described, each section is provided with a plurality of steam pipes on each side of each flue. For simplicity, the steam pipes will be referred to by the common designations 27, 28 and 29, the similarly numbered pipes having corresponding spaced positions in the several flues.

Inside each section below the chimney thereof, there is provided a steam manifold 30 adjacent to each opposite upright wall of the section. Steam emission pipes are connected to the manifolds and extend therefrom longitudinally of the section and are attached adjacent their outer ends to the flue walls by means of a bracket support 31. It is noted that top pipes 27 are connected to the manifold through valves 32 in order that the said pipes may be shut off if only a single rather than a double tray is utilized, as will hereinafter be described. The pipes are provided with longitudinal slots 33 which direct the steam therefrom into the food being processed as will shortly appear. The pipes, capped at their outer ends as at 34, are suitably vertically spaced from one another in order to provide a maximum steam contact with the foods.

A conveyor formed by two spaced endless chains 35 powered at 36 which ride on revoluble sprockets 37 mounted on the ends of the frame of the apparatus is provided in the apparatus and lies wholly in a horizontal plane and extends from one end of the apparatus to the other. The chains 35 are supported throughout the length of the apparatus by channel bearing guides 38 mounted adjacent to each side of the apparatus. The type of conveyor illustrated allows the steam to have direct contact with the foods carried thereon.

I prefer to use a carrier for foods to be processed comprising special trays, generally indicated at 40 (Fig. 4) which have reinforced mesh wire bottom portions 41 and end walls 42, but no side walls and which are adapted to be supported on and carried by the conveyor. The end walls act as vertical spacers so that two trays may be superimposed upon one another, as illustrated, although it is obvious that more than two trays may be utilized by proper modification of the apparatus. Because there are no sidewalls, steam emitted from pipes 27, 28 and 29 have direct access to the foods carried by the trays. As will be noted from reference to the drawings, pipes 27 discharge hot steam directly into the products carried on the top tray, pipes 28 emit steam between the two trays so that foods contained on the top and bottom trays are reached, and pipes 29 eject steam below the mesh bottomed bottom tray. It is obvious that by this arrangement, the foods carried on the trays are subjected to steam heat from both the top and bottom and from both sides, which results in a thorough and sure blanching action.

It is noted that each section is supplied with steam through separate source pipes 44 and regulator valves 45 and by pass valves 46 which control the flow of steam to the manifolds 30 through associated pipes 47. A conventional thermal control system is provided in each section comprising a thermometer 47 and an adjustable thermostatic control meter 48 and thermostatic valve 49 which can be regulated to predetermine the desired temperature within the apparatus. Canvas flaps 50 may be yieldably mounted in each end of the housing in order to restrain the possibility of steam egress therefrom and yet which allow easy movement of the trays thereinto and therefrom.

The feeding or starting end of the apparatus is designated at 51. Spray heads 52 are provided on each side of the feeding platform in order to rinse the foods off before traversal through the blancher. In operation, the trays carrying the foods to be processed are placed on the conveyor belt at the feeding end, and the foods are there rinsed. The foods then move through the apparatus on trays and are subjected to steam heat. The trays are finally removed from the apparatus at the collecting end or platform 53.

By reason of the undulating housing structure, adjustable chimney heads and the independently supplied slotted steam emission pipes for each section, it is possible to maintain a uniform high temperature throughout the apparatus. It is the tendency of hot steam to flow toward the high point of each section where a chimney is located, rather than gravitating through the feeding and collecting ends of the apparatus. The independently fed and controlled steam emission pipes make possible a distribution of steam of approximately the same temperature at all points in the apparatus. The slotted pipes do not clog or emit steam in a hit-or-miss fashion as do pipes conventionally perforated, and it is pointed out that the said pipes are arranged on each side of the housing in vertically spaced relation to one another and the level of the conveyor belt and trays in order to direct steam under, over and into the foods being processed.

By adjustment of the louvers in the chimneys and regulation of the feed valves, and operation of the thermal control system, the operator is able to build up and vary at will a uniform temperature from a low to extremely high range of heat without wasting the heated steam medium.

The conveyor belt lies in a constant horizontal plane, in contradistinction to the inclined housing sections, and makes it possible to feed products through the apparatus at increased speed without danger of spilling the same. In my novel structure the feeding and collecting ends are left open in order to facilitate the insertion and withdrawal of foods from the apparatus. Thus it is seen that all the advantages of a completely enclosed steam sealed apparatus are obtained in my device, without hindering the tempo of continuous production.

While I have illustrated and described my apparatus in considerable detail for purposes of clarity of description and example, it is understood that variations and modifications in detail may be made within the spirit of my invention and the scope of the appended claims.

What I claim is:

1. In a pre-cooking apparatus of the character described, the combination of a frame, an open ended, undulated housing mounted on said frame and terminating short of both ends thereof, the ends of said housing being located adjacent to low points thereof, said housing having hinged oppositely inclined top portions and chimneys provided adjacent to each high point thereof, steam emission pipes in said housing, means to govern ingress of steam into said housing, means to govern egress of steam therefrom, thermal control means, continuous conveyor means extending the length of said frame and operable through the housing in a constant horizontal plane in contradistinction to the undulations of the housing, and carrier means supported on said conveyor means whereby steam emitted by said steam emission pipes has direct access to products carried by said carrier means from both sides and the top and bottom thereof.

2. In a pre-cooking apparatus of the character described, the combination of a frame, an open ended, undulated housing mounted on said frame and terminating short of both ends thereof, the ends of said housing being located adjacent to low points thereof, said housing having hinged oppositely inclined top portions and chimneys adjacent the high points thereof, a plurality of slotted vertically spaced steam emission pipes mounted in said housing adjacent opposite upright walls thereof and extending longitudinally thereof, means to control ingress of steam into said housing, means to control egress of steam therefrom, thermal control means, and a continuous conveyor means extending the length of said frame and operable through the housing in a constant horizontal plane said conveyor disposed between the steam pipes, whereby the jets of steam issuing therefrom are directed over the conveyor.

3. In a pre-cooking apparatus of the character described, the combination of a frame, an open ended, housing mounted on said frame and terminating short of both ends thereof, said housing including a pair of oppositely inclined roof and cover sections with the high points of said roof sections adjacent to each other, steam emission pipes in said housing, means to govern ingress of steam into said housing, means to govern egress of steam therefrom, means to prevent water from dripping on foods contained in said housing, means to prevent accumulation of water in said housing, thermal control means, and continuous conveyor means extending the length of said frame and operable through the housing in a substantially horizontal plane.

4. In a pre-cooker the combination of a housing having an undulating floor and an undulating roof, an intermediate traveling conveyor to support the goods to be treated, longitudinally slitted steam pipes within the housing and at each side of the conveyor to direct steam around the goods under treatment on the conveyor, chimneys arranged at intervals in the roof of the housing, said housing having inclined hinged top portions acting as roof portions for the housing, and means for draining off the drip from the underside of said inclined roof portions without contaminating the goods on the conveyor.

5. In a pre-cooking apparatus the combination of an endless conveyor having its upper carrying flight arranged substantially in a horizontal plane, a housing for said conveyor, said housing including a series of inclined cover members constituting a fore and aft sloping roof portion, the housing having a bottom with fore and aft sloping inclined portions parallel with the corresponding cover portions above, and means to drain off the drip from said inclined cover members without coming into contact with the food products on the conveyor.

6. In a pre-cooking apparatus, the combination of an endless conveyor having its upper carrying flight arranged substantially in a horizontal plane, a housing for said conveyor, said housing including a pair of complementary cover members, the roof of each being inclined upwardly towards the other whereby condensation on the underside of said roof portions tends to drain away from the central higher portion, a chimney positioned between the upper ends of the two adjacent cover members, with means for regulating the escape of steam from the interior of the housing, and steam pipes within the housing and on opposite sides of the conveyor and having slits for the emission of sheet-like jets of steam in opposite directions over the conveyor.

7. In a pre-cooking apparatus, the combination of a conveyor arranged to travel in a substantially horizontal plane, a housing for said conveyor including hinged inclined cover portions arranged in pairs with the adjacent hinged ends of a pair positioned at the higher or apex portion of the housing, chimneys at the apex of said portions for the regulated escape of steam from the housing, steam pipes extending lengthwise of the housing and arranged on each side of the conveyor, said pipes having slits for the emission of sheet-like jets of steam disposed to discharge over the conveyor, and means to regulate the steam flow through said pipes, the housing and chimney having means to divert the water of condensation from falling onto the product to be cooked and carried by the conveyor.

ERVIN H. GUTHIER.